April 7, 1942.  E. S. BROWNBACK  2,278,825

WATER GAUGE PROTECTION AND ILLUMINATION

Filed July 5, 1940  2 Sheets-Sheet 1

INVENTOR
Ellington Sumner Brownback,
BY J. Stuart Freeman
ATTORNEY

April 7, 1942.   E. S. BROWNBACK   2,278,825
WATER GAUGE PROTECTION AND ILLUMINATION
Filed July 5, 1940   2 Sheets-Sheet 2

INVENTOR
Ellington Sumner Brownback,
BY
J. Stuart Freeman,
ATTORNEY

Patented Apr. 7, 1942

2,278,825

UNITED STATES PATENT OFFICE 2,278,825

WATER GAUGE PROTECTION AND ILLUMINATION

Ellington Sumner Brownback, Royersford, Pa.

Application July 5, 1940, Serial No. 344,120

5 Claims. (Cl. 73—293)

The object of the invention is to provide improvements in devices designed for the protection and illumination of water gauges, such as are employed upon boilers, tanks, reservoirs and the like.

Another object is to provide a device of this character, which can be readily formed of sheet metal instead of only by cast metal as heretofore, and which as a result will maintain at least the same degree of efficiency as that of previous devices, and at the same time cost substantially less to manufacture.

A further object is to provide in such a device the combination of a casing for a source of illumination, said casing being provided with angularly outwardly directed wings, a water gauge being supported between said wings, a preferably cylindrical transparent angularly adjustable shield for said illumination source within said casing, and means to permit the device as a unit to be mounted in any desired angular position upon or with relation to a tank, boiler, reservoir, or the like.

Still another object is to provide in a device of this character a lamp casing, having an upwardly directed aperture spanned by a transparent closure, through which light rays from the said lamp can shine upon any desired extraneous object, such for instance as a superimposed steam pressure indicating gauge, clock, or other such object as may be desired.

Figure 1:
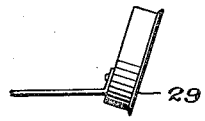
Figure 1:
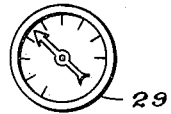
Figure 1:
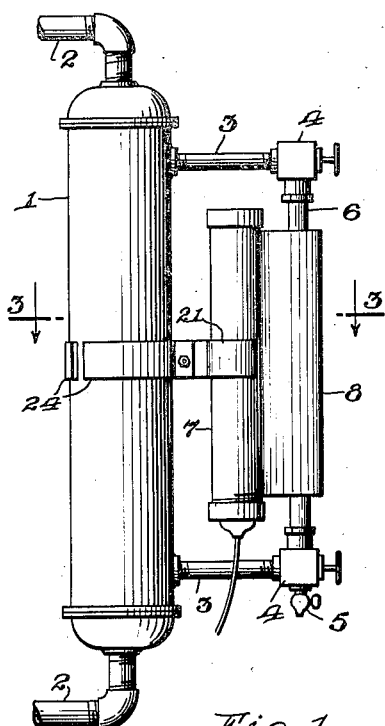
Figure 2:
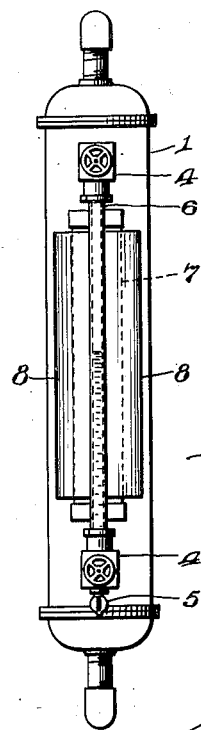
Figure 4:
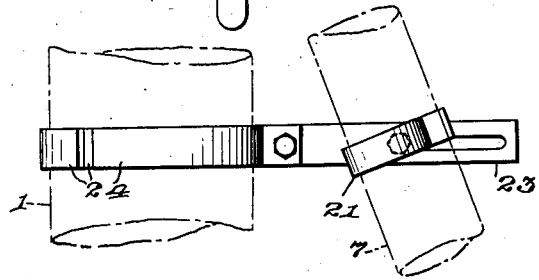
Figure 3:
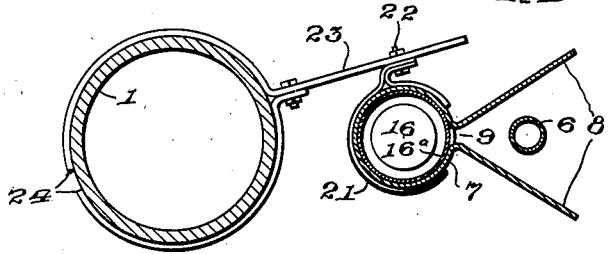
Figure 5:
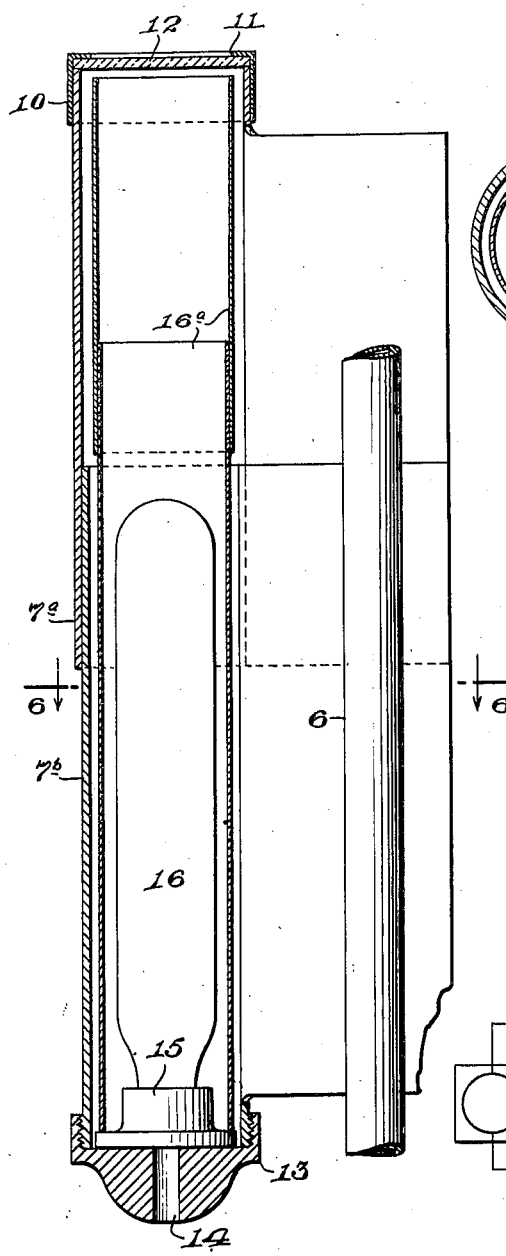
Figure 6:
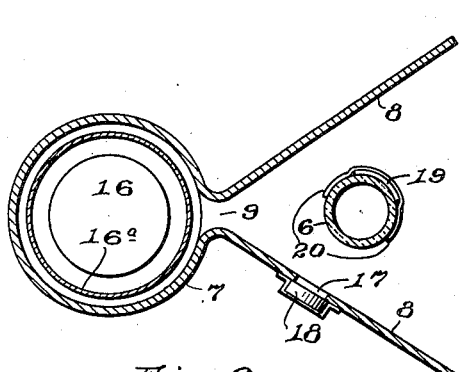
Figure 7:
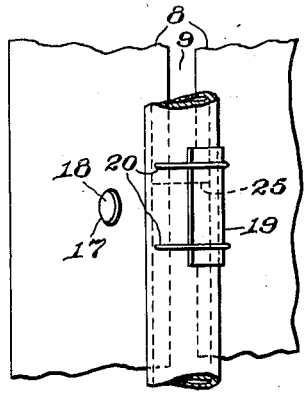
Figure 8:
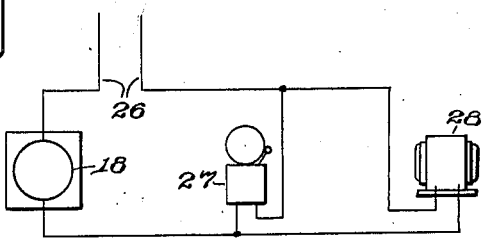

With the objects thus briefly stated, the invention comprises further details of construction and operation, which are hereinafter set forth in detail in the following description, when read in conjunction with the accompanying drawings, in which Fig. 1 is a side elevational view showing one embodiment of the invention; Fig. 2 is a front elevation of the same; Fig. 3 is an enlarged horizontal section on the line 3—3 of Fig. 1; Fig. 4 is a side elevational view of the supporting clamp per se; Fig. 5 is an enlarged vertical section through the improved type of lamp housing; Fig. 6 is a horizontal section on the line 6—6 of Fig. 5; Fig. 7 is a fragmentary front elevational view showing the relationship between the water glass reflector and the light-sensitive cell aperture in one of the lamp housing wings; and Fig. 8 is a simple electrical diagram showing the light-sensitive cell connected so as to cause the actuation of an alarm or other indicating means.

Referring to the drawings, a water tube 1 is shown as being provided at its upper and lower ends with pipes 2 by which it is operatively connected to a boiler, tank, reservoir, or the like (not shown). From said tube extend a pair of vertically spaced horizontal tubes or pipes 3, provided at their ends with L-valves 4, the lower valve having a pet-cock 5 and said valves in turn supporting the opposite ends of a vertically extending water glass 6.

The illuminating device embodying the present invention, comprises a cylindrical lamp housing 7, preferably formed of sheet metal, the opposite sides of which are reversely bent outwardly and divergently to form angularly related wings 8, which define between them an upwardly extending aperture 9. Said housing may comprise either a single sheet metal unit or a plurality of such sections 7a and 7b, as shown in Fig. 5, in which latter case said sections are telescopically related. In either case, however, the upper end of said housing is provided with a cap 10 having a central aperture 11, which is spanned by a transparent lens 12 of glass or similarly transparent material. The bottom of said housing is provided with a suitable closure 13, through which extends an axial bore 14, by way of which wires (not shown) lead to a socket 15, resting upon and preferably secured to the upper surface of said closure and adapted to support a vertically elongated incandescent lamp 16, or other source of illumination. Surrounding and protecting said lamp is a replaceable, angularly adjustable, transparent shield 16a, formed either of one or of a plurality of telescopic sections of glass or other suitable material, said shield being variable in overall length if made of two or more sections, as shown. With this simple construction, rays from said lamp can readily pass laterally outwardly through the aperture 9 and also vertically upwardly through the aperture 11 and lens 12.

One of the wings 8 is preferably provided with an aperture 17, to the rear of which is suitably supported a light-sensitive cell 18 of selenium or other suitable substance, while the water glass 6 is provided with a detachable and vertically adjustable reflecting element 19, which is secured by means of laterally resilient fingers 20 to said water glass in any desired angular position and elevation. It will be noted from Figs. 6 and 7 that the reflector 19 is positioned at such elevation upon said water glass, that it will reflect light rays, reaching it through the casing aperture 9 and said water glass, through the aperture 17 towards the cell 18. At the same time said reflector is purposely of such relatively limited horizontal width that it permits the water level in the glass 6 to be visible at all times.

For adjustably supporting the lamp housing 7 with respect to the water column 1, said housing is at least partially surrounded by a circular strap 21, which is adjustably secured by means of a bolt or set screw 22 to a horizontally extending arm 23 forming one end portion of a second strap 24, which surrounds the said water column and is itself adjustably secured thereto. By this construction the strap 24 can be shifted both vertically and angularly upon and with respect to said water column; the strap 21 can be shifted both vertically and angularly with respect to the lamp housing 7; and the lamp housing can be angularly adjusted with respect to said water column by means of the bolt and nut 22.

In the operation of this device, the lamp housing 7, with its wings 8, is set at such height that the cell 18 will be correct for the level at which it is desired to maintain water (or other liquid) in the boiler, tank, or the like, to which the device is attached. The reflector 19 will then be positioned at such height and angular relation with respect to said cell that light rays from the lamp within said housing will be directed towards said cell. Then, as the level of liquid within the water glass 6 rises or falls past said cell, the intensity of the light rays interrupted either by said water glass alone, or by both said water glass and the liquid therein, will vary the current flowing through an electric circuit comprising the conductors 26 and one or more desired indicating means, such for instance, as a bell 27 or other sound producing or visual device and/or a motor 28 in the feed line to automatically restore the desired water level, while at all times light rays from the lamp 16 will at all times be directed upwardly through the lens 12 toward the steam gauge 29, clock or other object, as may be desired.

In addition to the foregoing, further alterations may be made in the numerous details of construction without departing from the principles, which comprise the broad concept of the invention herein described and claimed.

In smaller boilers and similar installations, a device comprising the present invention can be easily attached to and supported by the water glass, when there is no other convenient member present, such as the water column upon large boilers and the like, to support said device. In such a case, the illuminating device is provided with one or more resilient clips, which detachably engage the water glass, or instead of such clips an arrangement of equal simplicity may be provided. It is also to be noted that this same principle of illumination can be applied economically to thermometers and other tubular instruments. When desired for use with thermometers, the illuminating device can be made of various sizes, even to a degree of smallness such that it can be carried by a physician in his pocket or medicine case and the enclosed lamp energized to illuminate a fever thermometer when placed in front of the relatively narrow slit in the side of the lamp housing.

Having thus described my invention, what I claim as new and desire to protect by Letters Patent of the United States is:

1. An illuminating unit for water gauge tubes, comprising a cylindrical casing having a substantially vertically extending aperture in one side, a lamp within said casing and a cylindrical transparent shield surrounding said lamp within said casing and spanning said aperture, said shield comprising a plurality of telescopically related sections adapted to be adjusted to vary their overall length, and said casing being provided exteriorly with integral angularly directed wings upon the opposite sides of said aperture to shield the water gauge tube and means to operatively support said casing with respect to said tube.

2. An illuminating unit for water gauge tubes, comprising a sheet metal element formed to provide a substantially cylindrical lamp housing provided with a longitudinally extending aperture, the sheet metal upon the opposite sides of said aperture being directed divergently outwardly to provide lateral shields for a water gauge tube between them, a bracket to support said element with respect to a water tube, a lamp positioned in said housing and a transparent cylindrical shield within said housing to protect said lamp.

3. An illuminating unit for water gauge tubes, comprising a sheet metal element formed to provide a substantially cylindrical lamp housing provided with a longitudinally extending aperture, the sheet metal upon the opposite sides of said aperture being directed divergently outwardly to provide lateral shields for a water gauge tube between them, a bracket to support said element with respect to a water tube, a lamp positioned in said housing and a transparent cylindrical shield within said housing to protect said lamp, said lamp shield comprising a plurality of telescopically related sections.

4. An illuminating unit for water gauge tubes, comprising a sheet metal element formed to provide a substantially cylindrical lamp housing provided with a longitudinally extending aperture, the sheet metal upon the opposite sides of said aperture being directed divergently outwardly to provide lateral shields for a water gauge tube between them, a bracket to support said element with respect to a water tube, a lamp positioned in said housing and a transparent cylindrical shield within said housing to protect said lamp, one end of said housing being open and spanned by a transparent lens.

5. An illuminating unit for water gauge tubes, comprising a sheet metal element formed to provide a substantially cylindrical lamp housing provided with a longitudinally extending aperture, the sheet metal upon the opposite sides of said aperture being directed divergently outwardly to provide lateral shields for a water gauge tube between them, a bracket to support said element with respect to a water tube, a lamp positioned in said housing and a transparent cylindrical shield within said housing to protect said lamp, said lamp shield comprising a plurality of telescopically related sections, one end of said housing being open and spanned by a transparent lens.

ELLINGTON SUMNER BROWNBACK.